United States Patent [19]

Barone et al.

[11] Patent Number: 5,254,284
[45] Date of Patent: Oct. 19, 1993

[54] GLASS CLEANER HAVING ANTIFOG PROPERTIES

[75] Inventors: Patrizia Barone, Wayne, N.J.; Michael T. Endres, Woodridge; Shanker B. Patel, Tinley Park, both of Ill.

[73] Assignee: Miles Inc., Elkhart, Ind.

[21] Appl. No.: 867,379

[22] Filed: Apr. 13, 1992

[51] Int. Cl.$^5$ .................. C11D 3/075; C11D 3/22
[52] U.S. Cl. ................ 252/174.15; 252/174.17; 252/DIG. 10; 252/DIG. 14; 106/13
[58] Field of Search ........... 252/174.15, 174.17, 252/DIG. 10, DIG. 14; 106/13

[56] References Cited

U.S. PATENT DOCUMENTS

| 3,249,550 | 5/1966 | Metters | 252/161 |
| 3,620,820 | 11/1971 | Hess | 117/124 |
| 3,696,043 | 10/1972 | Lebarge et al. | 252/153 |
| 3,935,367 | 1/1976 | Merrill et al. | 428/336 |
| 3,939,090 | 1/1976 | Zmoda | 252/90 |
| 3,950,289 | 4/1976 | D'Amato et al. | 260/23 X |
| 4,615,738 | 10/1986 | Sanders, Jr. et al. | 106/13 |
| 4,788,006 | 11/1988 | Bolich, Jr. | 252/550 |
| 4,960,553 | 10/1990 | Wisniewski et al. | 252/142 |
| 5,134,021 | 7/1992 | Hosono et al. | 428/213 |

*Primary Examiner*—Linda Skaling
*Assistant Examiner*—Kery A. Fries
*Attorney, Agent, or Firm*—Jerome L. Jeffers

[57] ABSTRACT

Disclosed is a cleaning composition for hard surfaces which comprises an aqueous solution of an acidic or basic cleaner, a surfactant together with a silicone glycol and xanthan gum as anti-fogging agents.

8 Claims, No Drawings

GLASS CLEANER HAVING ANTIFOG PROPERTIES

BACKGROUND OF THE INVENTION

This invention relates to a method of rendering nonporous surfaces resistant to wetting and fogging.

When nonporous surfaces are relatively cool and are exposed to a warmer moist atmosphere, the cool surface has a tendency to become fogged. The accumulation of fog on the surface may be objectionable for several reasons. If the surface of the material is intended to be transparent, such as an automobile windshield or eyeglass lenses, fogging can become a danger as well as an inconvenience.

Because of the manner in which fogging occurs, it is important that any anti-foggant treatment adhere firmly to vertical surfaces to which it is applied for a substantial period and that it be initially clear and remain clear without collecting dust after application to the surface.

Numerous antifog formulations are disclosed in the literature. For example, in U.S. Pat. No. 4,615,738 there is disclosed a transparent antifog composition for nonporous substrates which comprises an aqueous solution of hexamethylcyclotrisiloxane, an aliphatic alcohol having up to 4 carbon atoms and a surfactant.

U.S. Pat. No. 3,620,820 discloses the application of silicofluorocarbon compounds to siliceous surfaces thereby rendering them resistant to wetting.

A glass cleaning composition consisting of 0.3 to 5 weight percent of a water soluble salt of an alkyl sulfate having from 10 to 16 carbon atoms, from 1 to 5 weight percent of a monomethyl or monoethyl ether of diethylene dipropylene glycols, from 5 to 15 weight percent of isopropanol and from 93.7 to 75 weight percent water is disclosed in U.S. Pat. No. 3,249,550. This patent describes the enhancement of the glass cleaning composition's antifogging properties by the incorporation therein of from 0.001 to 2 weight percent of a silicone glycol.

SUMMARY OF THE INVENTION

This invention involves a combination of a silicone glycol and xanthan gum to inhibit the ability of atmospheric moisture to cause fogging to hard surfaces such as glass panes or mirrors.

This invention relates to a glass or similar hard surface cleaning composition of the spray on-wipe off type. The glass cleaner comprises an aqueous solution of a cleaning agent and a surfactant which exhibits improved anti-fogging properties due to the inclusion therein of a combination of a silicone glycol and a xanthan gum.

DESCRIPTION OF THE INVENTION

As previously noted, the hard surface cleaning compositions of the present invention are based upon an aqueous solution of a cleaning agent and a surfactant.

Typical cleaning agents include small amounts of a fugitive alkaline agent such as ammonia or other volatile alkaline materials such as alkanol amines or morpholine. Suitable amounts of the fugitive alkaline agent typically are within the range of from about 0.01% to 1% w/w with a preferred concentration lying within the range of from 0.03 to 0.07% on the active basis of the alkaline solution. Alternatively an acidic cleaning agent such as vinegar in an amount sufficient to provide acetic acid at a concentration of from about 0.01 to 0.5% w/w, preferably from 0.02 to 0.08% w/w, is a suitable cleaning agent.

The formulation also contains one or more surfactants. Typical of anionic surfactants are the sulfonated fatty alcohols containing from about 8 to 18 carbon atoms, sulfated fatty oils or esters, sulfated polyethylene oxides, ethers or fatty alcohols and alkyl aryl sulfonates which are present in the form of the alkali metal salts thereof especially the sodium salts.

Suitable non-ionic surfactants include, for example, the polyethylene oxide ethers of fatty alcohols and polyoxyethylene ethers of alkyl phenols. Preferred surfactants are ethoxylated alcohols having a carbon chain length of from 6 to 12 carbon atoms.

The surface active agent is typically present in an amount of from 0.01 to 0.5%, preferably 0.05 to 0.1% w/w, of the hard surface cleaning composition of the present invention. Mixtures of the surface active agents are suitable, and in some cases preferred, for incorporation into the cleaning composition.

Suitable silicone glycols are those which are soluble in the aqueous cleaning composition up to at least 0.01% and preferably from 0.025 to 0.6% on a weight/weight basis. Concentrations above about 1% are not recommended since hazing and streaking problems can occur at these levels. The silicone glycols described in previously mentioned U.S. Pat. No. 3,249,550, which is incorporated herein by reference, are suitable for use in the present invention. Preferred compositions are those polyoxyethylene polyalkyl($C_1$-$C_4$) siloxanes which are characterized by the general formula:

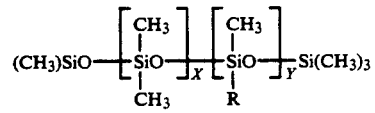

wherein R is:

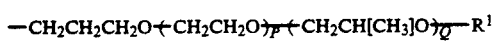

and $R^1$ is H or alkyl typically containing from 1 to 4 carbon atoms. These silicone glycols are surfactants in their own right and the hydrophile-lipophile balance can be adjusted by varying the ethylene oxide (EO): propylene oxide (PO) content of the R chain. Furthermore, the silicone-organic ratios may be adjusted through management of the silicone backbone, i.e. the ratio of X to Y in the above general formula. Since water solubility is a desirable attribute of the silicone glycols useful in the present formulation, the value of X will typically be 1-50 (preferably from 10 to 30) with the value of Y ranging from 1 to 22 (preferably from 5-15). The number represented by P typically ranges from 1 to 62 (preferably 15 to 45) and the value of Q is from 1 to 90 (preferably from 25 to 60). While the molecular weight of the silicone glycol is not critical, a molecular weight of from about 2,000 to 4,000 is typical due to solubility considerations with a molecular weight of from about 2500 to 2750 being preferred. This constituent will normally be included in the hard surface cleaning composition in amount of from about 0.01 to 1.0% w/w preferably from 0.1 to 0.5% w/w thereof.

In addition to the silicone glycol there is present in the cleaning composition from 0.001 to 0.1% w/w, preferably from 0.00625 to 0.025%, xanthan gum, i.e. a polysaccharide secreted during the fermentation under aerobic conditions of a bacterium of the species *Xanthomonas campestris.* This gum is commercially available as a cream colored powder that dissolves in either hot or cold acidic or basic water to produce solutions with a high viscosity at low concentrations and have unique rheological properties. The preferred xanthan gums are those water dispersible gums having a molecular weight within the range of from 1.5 million to 2.5 million with the preferred molecular weight being approximately 2 million. Xantham gums in the form of a dry powder of particles ranging in size from about 150 to 200 $\mu$ and whose 1% solutions have a pH of from 5.5 to 8.5 are particularly desirable for use in the present invention since they are readily soluble in the cleaning solutions and provide a hard surface cleaner that is not hazy or prone to phase separation.

The basic components of the hard surface cleaning composition are, in addition to water, the basic or acidic cleaning composition, surfactant, silicone glycol and xanthan gum. Additionally, such other conventional ingredients as perfumes, foaming agents, dyes, chelating agents and inorganic builders can be used within the scope of the present invention.

The present invention is further illustrated by the following examples:

EXAMPLE I

A hard surface cleaner was prepared by adding the following ingredients to water in the indicated amounts:

| Ingredient | % (w/w) |
| --- | --- |
| Glycol ether | 7.750 |
| Surfactants | |
| Primary ethoxylated non-ionic surfactants ($C_6$–$C_{12}$) | 0.006 |
| Apple Fragrance | 0.020 |
| Masil 280** | 0.050 |
| Sodium salt of polymerized naphthalene sulfonic acid | 0.040 |
| EDTA-$Na_2$ (1.0% soln) | 0.600 |
| Conc. Dist. White Vinegar (12% acetic acid) | 0.417 |
| Gluteraldehyde (50%) | 0.020 |
| FDC Blue #1 (0.10% soln) | 0.290 |
| D&C Yellow #10 (0.10% soln) | 0.300 |
| Xanthan Gum (K5C151)* | 0.025 |
| Masil 280 LP** | 0.025 |
| Deionized Water | Q/S |

*Kelco Division of Merck & Co. (Xantham gum)
**Polyoxyethylene polyalky siloxane.

This formulation was tested as follows:

A glass panel or mirror is completely cleaned with a 5% solution of butyl cellosolve in deionized water and the surface is tested for cleanliness by steaming it using a Norelco fabric steamer Model TS60. If the surface does not fog completely it is recleaned as in the previous step and both of the preceding steps are carried out until the surface is completely cleaned. After cleaning, two full strokes of the composition of this invention are sprayed on the glass using a trigger sprayer and the surface is wiped with paper toweling to evenly spread the cleaner without wiping to complete dryness. At this point the steamer is passed over the entire length of the center of the surface in an up and down direction 12 times (6 times up and 6 times down) while holding the steamer 1 to 1.5 inches from the surface. As the surface is being steamed, notice is taken as to whether the surface becomes fogged on any portion which is steamed and at which of the 12 steaming cycles the fogging occurs. In addition, notice is taken of whether water droplets form on the surface and whether the total area of fogging is one third or more of the mirror surface. At this point the surface is allowed to air dry to complete dryness. The steaming and drying cycle is repeated until a trend of failure, indicated by increasing fogginess or water droplet formation with successive passes of the steamer, is noted. The number of completed steamer cycles; before fogging or water droplets, cycle and stroke numbers when fogging or water droplets are first observed and when failure is confirmed by increasing fog or water droplets on the mirror; are recorded.

The formulation set out in this example, which had been aged for 3 months at room temperature, survived 11 strokes of the steamer before failure was observed.

EXAMPLE II

Several hard surface cleaning compositions were prepared using the ingredients as in Example I. Each formulation was tested as in Example I.

The particular formulations are as indicated in Table 1.

TABLE 1

| Ingredients % | A | B | C | D | E | F | G |
| --- | --- | --- | --- | --- | --- | --- | --- |
| Water | Q.S. | Q.S. | Q.S. | Q.S. | Q.S. | Q.S. | Q.S. |
| Solvents | 7.000 | 7.000 | 7.000 | 7.000 | 7.000 | 7.000 | 7.000 |
| Surfactants | 0.150 | 0.150 | 0.150 | 0.150 | 0.150 | 0.150 | 0.150 |
| Chelating Agents | 0.010 | 0.010 | 0.010 | 0.010 | 0.010 | 0.010 | 0.010 |
| Fragrances & Dyes | 0.100 | 0.100 | 0.100 | 0.100 | 0.100 | 0.100 | 0.100 |
| Other (Vinegar gluteraldehyde and Daxad) | 0.500 | 0.500 | 0.500 | 0.500 | 0.500 | 0.500 | 0.500 |
| Silicone Glycol | 0.000 | 0.000 | 0.250 | 0.250 | 0.125 | 0.063 | 0.250 |
| Xanthan Gum | 0.000 | 0.025 | 0.000 | 0.025 | 0.013 | 0.006 | 0.000 |
| Guar Gum | 0.000 | 0.000 | 0.000 | 0.000 | 0.000 | 0.000 | 0.025 |

Each of the formulations, A–F were subjected to the anti-fogging test described in Example I.

The formulations were rated based on the number of cycles which were required until fogging occurred. The results of this test are as follows:

| Formula | Number of Cycles |
| --- | --- |
| A | 1 |
| B | 1 |
| C | 3 |
| D | 9 |
| E | 6 |
| F | 6 |
| G | 4 |

Based on these data, one can perceive a distinct synergistic relation between the silicone glycol and the xanthan gum. Formula A, which contained neither of these ingredients, permitted fogging with only one cycle. The same is true for formulation B which contained 0.025% xanthan gum but no silicone glycol. In formula C, which contained the silicone glycol but no xanthan gum, some anti-fog effect was noted since fogging did not reoccur until the cycle was repeated 3 times. However, unexpectedly, the combination of 0.250% silicone glycol and 0.025% xanthan gum which was present in formula D resulted in a surface that required 9 cycles before fogging reoccurred. Formulae E and F which contained only very small amounts of the silicone glycol and xanthan gum further illustrate the synergistic effect which these ingredients exhibit when used in combination since even when their concentration is cut by half (formula E) and by half again (formula F) the mirror remains unfogged over 6 cycles. Formula G, which contained a low level of guar gum in place of the xanthan gum showed only minor improvement since steaming was noted in 4 cycles.

EXAMPLE III

Several additional formulations, all but 2 of which contained the silicone glycol, were prepared using various ingredients commonly used as thickeners. These formulations were screened in the anti-fogging test as previously described. In addition these formulations were tested for their cleaning power for removal of grease-like substances using a modification of Chemical Specialties Manufacturers Association, Inc. (CSMA) method DCC-09.

The procedure used is as follows:

Glass plates, 17 in. × 17 in. × ⅛ in. are thoroughly cleaned before use and between us washing with a mild dishwashing detergent, rinsed with water and stacked loosely in an automatic dishwasher. The dishwasher is set for one whole wash cycle, without any detergent being used, and stopped immediately before the dry cycle whereupon each glass pane is removed and dried by hand before water spotting can occur. The glass pane must be perfectly clean and clear before it can be used as a test panel.

A synthetic soil sebum, containing

| palmitic acid | 10% (w/w) |
| stearic acid | 5 |
| coconut oil | 15 |
| paraffin wax | 10 |
| spermaceti | 15 |
| olive oil | 20 |
| Squalene | 5 |
| Cholesterol | 5 |
| Oleic acid | 10 |
| linoleic acid | 5 | was prepared by melting the paraffin wax at a temperature not exceeding 130° F. and then adding the other ingredients with thorough mixing. This formulation is stored in a refrigerator until needed whereupon 0.07 gm of the sebum is applied to each glass plate being tested using a laboratory tissue wrapped around the index finger until the soil covers an area measuring 5 ½ to 6 inches wide in the center of the plate leaving the two end areas clean. The soiled plates are aged for 24 hours at room temperature and used within 7 days.

One half of each soiled glass is draped with a 17 in. × 17 in. cover to avoid overspray when applying the glass cleaner to the remaining exposed area. Six sprays of glass cleaner are applied uniformly over the exposed plate area and allowed to penetrate the soiled area for one minute after which period the drape is removed and the treated portion of the glass panel is centered under a Gardner heavy duty abrasion tester. A 13 gm piece of cheesecloth (grade 40—cut into 16 in. lengths (41 cm)) is wrapped around a wooden block with no ends being along the cleaning area and inserted snugly into the carrier and the devices weights are adjusted so that the total weight of the carrier, wood and cheesecloth is about 454 gm.

The Gardner device is allowed to run, with the cheesecloth up against the glass, for 5 cycles (10 strokes) whereupon the cheesecloth covered block is turned over and wiping is continued for an additional 5 cycles (5 strokes) for a total of 10 cycles (10 strokes).

Each side of the cleaned glass plate is rated for cleaning ability according to the following scale:

4 = Perfectly clean and clear
3 = Good soil removal, slight streaking and/or filming
2 = Moderate soil removal, moderate streaking and/or filming
1 = Poor soil removal, severe streaking and/or filming In addition to the cleaning study, the antifog properties of each formulation were tested as previously described and the appearance of each formulation, expressed as Cl, Clear; CD, Cloudy or Sep, Separation was noted.

Referring to Table 2 which represents experiments in which the surfactants, chelating agents, dyes and fragrances were the same as those set out in Example I, it can be determined that the formulation containing guar gum (H) at a concentration equal to that of xanthan gum in formula G was equivalent to the xanthan gum containing formulation in terms of cleaning performance with both formulations receiving a cleaning performance rating of 4. However, the antifog properties of formulation G containing xanthan gum were clearly superior to the guar gum containing formulation in terms of its anti-fog properties with a rating of 10 -vs- the 4 rating for formulation H. In addition, formula H appeared cloudy whereas formula G was clear.

The other thickening agents used performed less well than guar gum. The formulation containing polyoxyethylene (20) oleyl ether as thickener (I) was rated 1 in terms of cleaning ability and anti-fog properties. This formulation remained clear during the course of the experiment. Similar observations were made with formula J which contained hydroxy ethyl cellulose as thickener, i.e. a rating of 2 and 3 respectively, and separated from the formulation upon standing. Formula K containing fatty amines as thickener formed a cloudy formulation and was scored as 3 in the cleaning and anti-fog tests. Formulation L, in which polyacrylic acid was used as the thickener, the formulation cleaner was rated as 4 in terms of cleaning ability but was scored only 1 in terms of its antifogging ability. This thickener also separated from the formulation. Finally, a formulation in which magnesium aluminum sulfate was employed as the thickener was tested. This formulation (Formula M) rated 4 in terms of cleaning ability and 6 in terms of its anti-fog properties. It is deemed unsuitable as a commercial glass cleaner because separation occurred.

TABLE 2

| INGREDIENTS | FORMULA A | FORMULA B | FORMULA C | FORMULA D | FORMULA E | FORMULA F | FORMULA G |
|---|---|---|---|---|---|---|---|
| WATER | Q.S. | Q.S. | Q.S. | Q.S. | Q.S. | Q.S. | Q.S. |
| SOLVENTS | 7.000% | 7.000% | 7.000% | 7.000% | 7.000% | 7.000% | 7.000% |
| SURFACTANTS | 0.150% | 0.150% | 0.150% | 0.150% | 0.150% | 0.150% | 0.150% |
| CHELATING AGENTS | 0.010% | 0.010% | 0.010% | 0.010% | 0.010% | 0.010% | 0.010% |
| FRAGRANCES & DYES | 0.100% | 0.100% | 0.100% | 0.100% | 0.100% | 0.100% | 0.100% |
| OTHER | 0.500% | 0.500% | 0.500% | 0.500% | 0.500% | 0.500% | 0.500% |
| SILICONE GLYCOL | 0.000% | 0.000% | 0.250% | 0.250% | 0.125% | 0.063% | 0.250% |

TABLE 2-continued

| INGREDIENTS | | | | | | | |
|---|---|---|---|---|---|---|---|
| XANTHAN GUM | 0.000% | 0.025% | 0.000% | 0.250% | 0.013% | 0.006% | 0.025% |
| GUAR GUM | 0.000% | 0.000% | 0.000% | 0.000% | 0.000% | 0.000% | 0.000% |
| POLYOXYETHYLENE(20) OLEYL ETHER | 0.000% | 0.000% | 0.000% | 0.000% | 0.000% | 0.000% | 0.000% |
| HYDROXYL ETHYL CELLULOSE | 0.000% | 0.000% | 0.000% | 0.000% | 0.000% | 0.000% | 0.000% |
| FATTY AMINES | 0.000% | 0.000% | 0.000% | 0.000% | 0.000% | 0.000% | 0.000% |
| POLYACRYLIC ACID POLYMER | 0.000% | 0.000% | 0.000% | 0.000% | 0.000% | 0.000% | 0.000% |
| MAGNESIUM ALUMINUM SILICATE | 0.000% | 0.000% | 0.000% | 0.000% | 0.000% | 0.000% | 0.000% |
| CLEANING PERFORMANCE SCORE (1: HEAVY STREAKS, 4: NO STREAKS) | 4 | 4 | 4 | 4 | 4 | 4 | 4 |
| ANTI-FOG RATING (# OF CYCLES TILL FOG OR STREAKING OCCURS) | 1 | 1 | 3 | 9 | 6 | 6 | 10 |
| INITIAL PRODUCT APPEARANCE (CL: CLEAR, CD: CLOUDY, SEP: SEPARATION) | CL | CL | CL | CL | CL | CL | CL |

| INGREDIENTS | FORMULA H | FORMULA I | FORMULA J | FORMULA K | FORMULA L | FORMULA M |
|---|---|---|---|---|---|---|
| WATER | Q.S. | Q.S. | Q.S. | Q.S. | Q.S. | Q.S. |
| SOLVENTS | 7.000% | 7.000% | 7.000% | 7.000% | 7.000% | 7.000% |
| SURFACTANTS | 0.150% | 0.150% | 0.150% | 0.150% | 0.150% | 0.150% |
| CHELATING AGENTS | 0.010% | 0.010% | 0.010% | 0.010% | 0.010% | 0.010% |
| FRAGRANCES & DYES | 0.100% | 0.100% | 0.100% | 0.100% | 0.100% | 0.100% |
| OTHER | 0.500% | 0.500% | 0.500% | 0.500% | 0.500% | 0.500% |
| SILICONE GLYCOL | 0.250% | 0.250% | 0.250% | 0.250% | 0.250% | 0.250% |
| XANTHAN GUM | 0.000% | 0.000% | 0.000% | 0.000% | 0.000% | 0.000% |
| GUAR GUM | 0.025% | 0.000% | 0.000% | 0.000% | 0.000% | 0.000% |
| POLYOXYETHYLENE(20) OLEYL ETHER | 0.000% | 0.025% | 0.000% | 0.000% | 0.000% | 0.000% |
| HYDROXYL ETHYL CELLULOSE | 0.000% | 0.000% | 0.025% | 0.000% | 0.000% | 0.000% |
| FATTY AMINES | 0.000% | 0.000% | 0.000% | 0.025% | 0.000% | 0.000% |
| POLYACRYLIC ACID POLYMER | 0.000% | 0.000% | 0.000% | 0.000% | 0.025% | 0.000% |
| MAGNESIUM ALUMINUM SILICATE | 0.000% | 0.000% | 0.000% | 0.000% | 0.000% | 0.025% |
| CLEANING PERFORMANCE SCORE (1: HEAVY STREAKS, 4: NO STREAKS) | 4 | 1 | 2 | 3 | 4 | 4 |
| ANTI-FOG RATING (# OF CYCLES TILL FOG OR STREAKING OCCURS) | 4 | 1 | 3 | 3 | 1 | 6 |
| INITIAL PRODUCT APPEARANCE (CL: CLEAR, CD: CLOUDY, SEP: SEPARATION) | CD | CL | SEP | CL | SEP | SEP |

What is claimed is:

1. In a composition for cleaning hard surfaces which comprises water, a cleaning agent and a surfactant, the improvement which comprises the inclusion therein of a silicone glycol, having a molecular weight of from about 2,000 to 4,000 in an amount of from about 0.01 to 1.0% w/w of the composition and from about 0.01 to 1.0% w/w of a xanthan gum having a molecular weight of from about 1.5 million to 2.5 million to inhibit the fogging of said hard surface subsequent to the application of the cleaning composition thereto.

2. The composition of claim 1 wherein the silicone glycol is characterized by the formula:

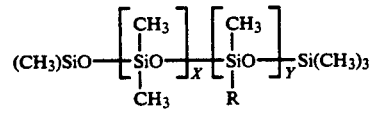

wherein R is:

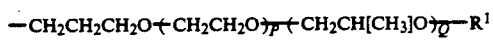

wherein $R^1$ is H or alkyl of 1 to 4 carbon atoms wherein X is 1 to 50; Y is 1 to 22; p is 1 to 62 and Q is 25 to 60.

3. The composition of claim 1 wherein the silicone glycol has a molecular weight of from about 2500 to 2750 and is present in an amount of from 0.1 to 0.5% w/w of the composition.

4. The composition of claim 6 wherein the xanthan gum has a molecular weight of about 2 million.

5. The formulation of claim 1 wherein the cleaning agent is acetic acid or ammonium hydroxide.

6. The composition of claims 1 through 5 wherein the xanthan gum is present in an amount of from 0.1 to 0.5% w/w of the composition.

7. A composition for cleaning glass surfaces which provides the glass surface with increased resistance to fogging when contacted with water vapor, which composition comprises water, a cleaning agent and a surfactant together with 0.01 to 1.0% w/w xanthan gum having a molecular weight of from 1.5 to 2.5 million and a silicone glycol having a molecular weight of from about 2,000 to 4,000 and is characterized by the formula:

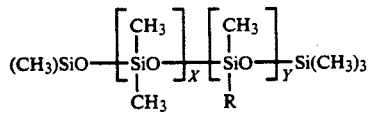

wherein R is:

wherein $R^1$ is H or alkyl of 1 to 4 carbon atoms, and wherein X is 1 to 50; Y is 1 to 22; p is 1 to 62 and Q is 25 to 60.

8. The formula of claim 7 wherein the cleaning agent is acetic acid or ammonium hydroxide, the xanthan gum has a molecular weight of about 2 million and is present in an amount of from 0.1 to 0.5% w/w; the silicone glycol has a molecular weight of from about 2,500 to 2,750; X is 10 to 30, Y is 5 to 15, p is 5 to 45 and Q is 25 to 60; and is present in an amount of from 0.1 to 0.5% w/w of the composition.

* * * * *